United States Patent
Saika

(10) Patent No.: US 7,024,531 B2
(45) Date of Patent: Apr. 4, 2006

(54) BACKUP SYSTEM, BACKUP METHOD, AND PROGRAM THEREFOR

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/898,974

(22) Filed: Jul. 27, 2004

(65) Prior Publication Data

US 2005/0210080 A1    Sep. 22, 2005

(30) Foreign Application Priority Data

Mar. 18, 2004  (JP)  ............................ 2004-078535

(51) Int. Cl.
*G06F 12/00* (2006.01)

(52) U.S. Cl. ..................... 711/162; 711/112; 711/114; 709/217

(58) Field of Classification Search ............... 711/111, 711/112, 114, 162; 709/217, 208, 238, 239
See application file for complete search history.

(56) References Cited

U.S. PATENT DOCUMENTS

| | | | |
|---|---|---|---|
| 6,857,053 B1 * | 2/2005 | Smith et al. ................ | 711/162 |
| 6,865,655 B1 * | 3/2005 | Andersen ..................... | 711/162 |
| 2002/0112022 A1 | 8/2002 | Kazar et al. | |
| 2003/0009438 A1 | 1/2003 | Achiwa et al. | |
| 2003/0196052 A1 * | 10/2003 | Bolik et al. ................. | 711/162 |
| 2003/0221075 A1 | 11/2003 | Achiwa et al. | |
| 2004/0205152 A1 | 10/2004 | Yasuda et al. | |
| 2005/0033748 A1 | 2/2005 | Kazar et al. | |

FOREIGN PATENT DOCUMENTS

JP    2003-330782    11/2003

* cited by examiner

*Primary Examiner*—Brian R. Peugh
(74) *Attorney, Agent, or Firm*—Antonelli, Terry, Stout and Kraus, LLP.

(57) ABSTRACT

Data is stored to a disk drive (4) in a directory path designated by a write request, and a directory path as a backup object and the directory path for the write request are compared with each other. When the directory paths match each other, the data is transferred to backup systems (3 and 5). In the case where the directory path for the write request is not the backup object, the data in the directory path is requested to be backed up when the directory path matches a preset condition.

13 Claims, 20 Drawing Sheets

| # | DATE AND TIME | | DIRECTORY PATH | USER ID |
|---|---|---|---|---|
| 1 | 2004/2/27 | 13:10:05 | /share/nfs·share11 | User001 |
| 2 | 2004/2/27 | 13:10:06 | /share/nfs·share12 | User005 |
| 3 | 2004/2/27 | 13:10:07 | /share/nfs·share11 | User002 |
| 4 | 2004/2/27 | 13:10:07 | /share/nfs·share12 | User003 |
| : | | | : | : |
| 5 | 2004/2/27 | 13:31:23 | /home/user013 | User001 |
| 6 | 2004/2/27 | 13:31:28 | /home/user013 | User002 |
| 7 | 2004/2/27 | 13:31:29 | /home/user013 | User005 |
| : | | | : | : |
| | | | | |

*FIG. 5*

/share/nfs·share11
/share/nfs·share12
/share/nfs·share11
/share/nfs·share12
 .
 .
/home/user013
/home/user013
/home/user013

| # | DIRECTORY PATH | ACCESS COUNT |
|---|---|---|
| 1 | /share/nfs·1 | 10 |
| 2 | /share/cifs·1 | 20 |
| : | : | |
| : | : | |

| # | USER ID | DIRECTORY PATH |
|---|---|---|
| 1 | user 001 | /home/user 001 |
| 2 | user 002 | /bin |
| 3 | : | : |
| 4 | : | : |
| : | | |

| DIRECTORY PATH NAME | ACCESS USERS |
|---|---|
| /share/nfs·share11 | 100 |
| /share/nfs·share12 | 100 |
| /share/nfs·share14 | 100 |
| /share/nfs·share9 | 50 |
| /share/nfs·share11 | 50 |
| /share/nfs·share12 | 10 |
| /share/nfs·share13 | 10 |
| : | : |
| /home/user011 | 1 |
| /home/user012 | 1 |
| /home/user013 | 1 |

*FIG. 12*

| DIRECTORY PATH NAME | RATIOS OF THE NUMBERS OF ACCESS USERS |
|---|---|
| /share/nfs·share11 | 0.1 |
| /share/nfs·share12 | 0.1 |
| /share/nfs·share14 | 0.1 |
| /share/nfs·share9 | 0.05 |
| /share/nfs·share11 | 0.05 |
| /share/nfs·share12 | 0.01 |
| /share/nfs·share13 | 0.01 |
| : | : |
| /home/user011 | 0.001 |
| /home/user012 | 0.001 |
| /home/user013 | 0.001 |
| | |

| # | DIRECTORY PATH NAME | NUMBERS OF ACCESS USERS |
|---|---|---|
| 1 | /share/nfs·share14 | 100 |
| 2 | /share/nfs·share9 | 50 |
| 3 | /share/nfs·share13 | 10 |
| : | : | : |
|  | /home/user011 | 1 |
|  | /home/user012 | 1 |

*FIG. 14*

| # | BACKUP PROCEDURE |
|---|---|
| 1 | REMOTE COPY AND REMOTE BACKUP |
| 2 | LOCAL OVERWRITE AND REMOTE BACKUP |
| 3 | REMOTE BACKUP |
| 4 | LOCAL BACKUP |
| 5 | None |

*FIG. 16*

| # | DIRECTORY PATH NAME | BACKUP PROCEDURE |
|---|---|---|
| 1 | /share/nfs·share14 | REMOTE COPY AND REMOTE BACKUP |
| 2 | /share/nfs·share9 | LOCAL OVERWRITE AND REMOTE BACKUP |
| 3 | /share/nfs·share13 | REMOTE BACKUP |
| 4 | /share/nfs·share12 | LOCAL BACKUP |
| 5 | : | None |

| # | DIRECTORY PATH | ACCESS USER NUMBER |
|---|---|---|
| 1 | /share/nfs ·share11 | 35 |
| 2 | /share/nfs ·share12 | 20 |
| 3 | /share/nfs ·share14 | 15 |
| 4 | /share/nfs ·share 9 | 45 |
| 5 | /share/nfs ·share11 | 20 |
| 6 | /share/nfs ·share12 | 0 |
| 7 | /share/nfs ·share13 | 8 |
| : | : | : |
|  | /home/user 011 | 1 |
|  | /home/user 012 | 0 |
|  | /home/user 013 | 1 |

| # | DIRECTORY PATH | ACCESS USER NUMBER |
|---|---|---|
| 1 | /share/cifs ·share 9 | 45 |
| 2 | /share/nfs ·share 14 | 15 |
| 3 | /share/cifs ·share 13 | 8 |
| : | : | : |
|  | /home/user 011 | 1 |
|  | /home/user 012 | 0 |

*FIG. 24*

BACKUP SYSTEM, BACKUP METHOD, AND PROGRAM THEREFOR

CLAIM OF PRIORITY

The present application claims priority from Japanese application P2004-78535 filed on Mar. 18, 2004, the content of which is hereby incorporated by reference into this application.

BACKGROUND

The present invention relates to a technology for backing up data stored in a storage system, and more particularly to a technology for automatically backing up data stored in a NAS.

Data stored in a storage system makes itself redundant by backup thereof in a physically different storage system. In particular, for data stored in a Network Attached Storage (NAS), a backup system is known, which backs up directory paths and files of a predetermined file system according to a hierarchical structure (of the directory paths and files), the directory paths and files being preset by an administrator by means of a management console (for example, refer to JP 2003-330782 A).

SUMMARY

However, the conventional technology described above backs up the directory paths and the files for which the backup is necessary after presetting the directory paths and the files, and accordingly cannot back up directory paths and files which are not the objects to be backed up because the administrator omits to set these directory paths and files as the objects.

In light of the foregoing, the present invention has been made in consideration of the above problem, and it is therefore an object of the present invention to automatically back up even the directory paths and the files which are not set as backup objects, when backing up data.

According to the present invention, there is provided a data backup method for storing data for which a write request has been received to a first system in a directory path designated by the write request and transferring the data to a second system, the method including the steps of: presetting a directory path for a backup object to be transferred to the second system; storing the data in the directory path for the first system based on the write request; comparing the directory path for the received write request and the directory path for the backup object transferred to the second system with each other, and when the directory paths match each other, transferring the stored data to the second system; when the directory path designated by the write request does not match the directory path for the backup object, determining whether or not the designated directory path matches a preset condition; when the designated directory path matches the preset condition, issuing a request to transfer data in the designated directory path to the second system; and transferring the data to the second system based on the request.

Hence, the present invention can automatically back up even the directory paths which are not set as the backup objects, and can certainly perform the backup even if the administrator has made a setting error.

BRIEF DESCRIPTION OF THE DRAWINGS

FIG. 5 is an explanatory diagram showing an example of a log file.

FIG. 6 is an explanatory diagram showing an example of a backup object range file created by the backup range acquisition processing.

FIG. 8 is an explanatory diagram showing an example of a table T1 indicating directory paths and the number of accesses.

FIG. 9 is an explanatory diagram showing an example of a table T2 indicating user IDs and directory paths.

FIG. 12 is an explanatory diagram showing an example of a file in which directory paths created by the NFS/CIFS server are listed and the numbers of access users are accumulated.

FIG. 13 is an explanatory diagram showing an example of a file in which the same directory paths as those in FIG. 12 and ratios of the numbers of access users are listed.

FIG. 14 is an explanatory diagram showing an example of a work file created by the backup execution determining processing.

FIG. 16 is an explanatory diagram of a table of backup procedures according to importance.

FIG. 17 is an explanatory diagram showing an example of directory paths to be automatically backed up and a setting of the backup procedures.

FIGS. 21A and 21B are flowcharts showing an example of backup request receiving processing of the backup request control unit according to the second embodiment, in which FIG. 21A shows a main route, and FIG. 21B shows a thread created by the main routine.

FIG. 23 is an explanatory diagram showing an example of a file in which directory paths created by an NFS/CIFS server are listed and the numbers of access users are accumulated according to the second embodiment.

FIG. 24 is an explanatory diagram showing an example of a work file created by backup execution determining processing according to the second embodiment.

DETAILED DESCRIPTION OF THE PREFERRED EMBODIMENTS

First Embodiment

A first embodiment of the present invention will be described below with reference to the accompanying drawings.

Figure 1:
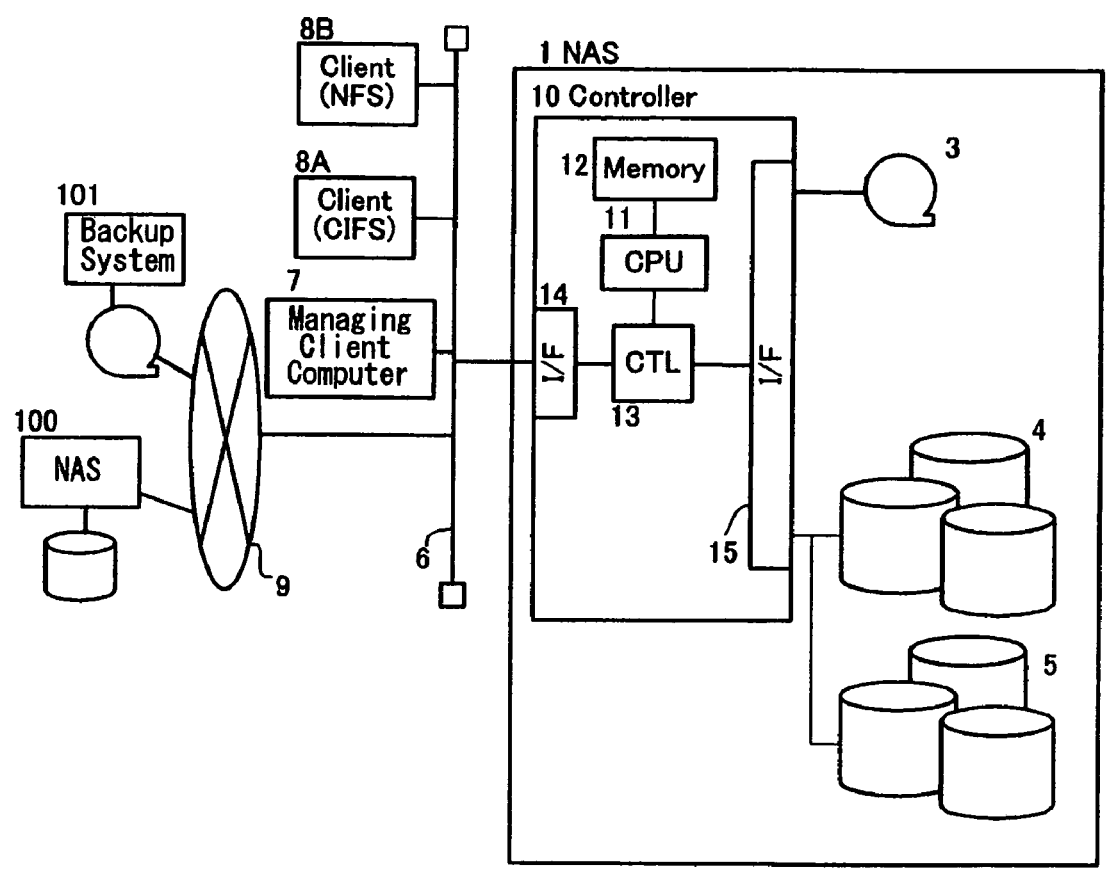
FIG. 1 is a block diagram showing an entire configuration of a system according to a first embodiment.
Figure 2:
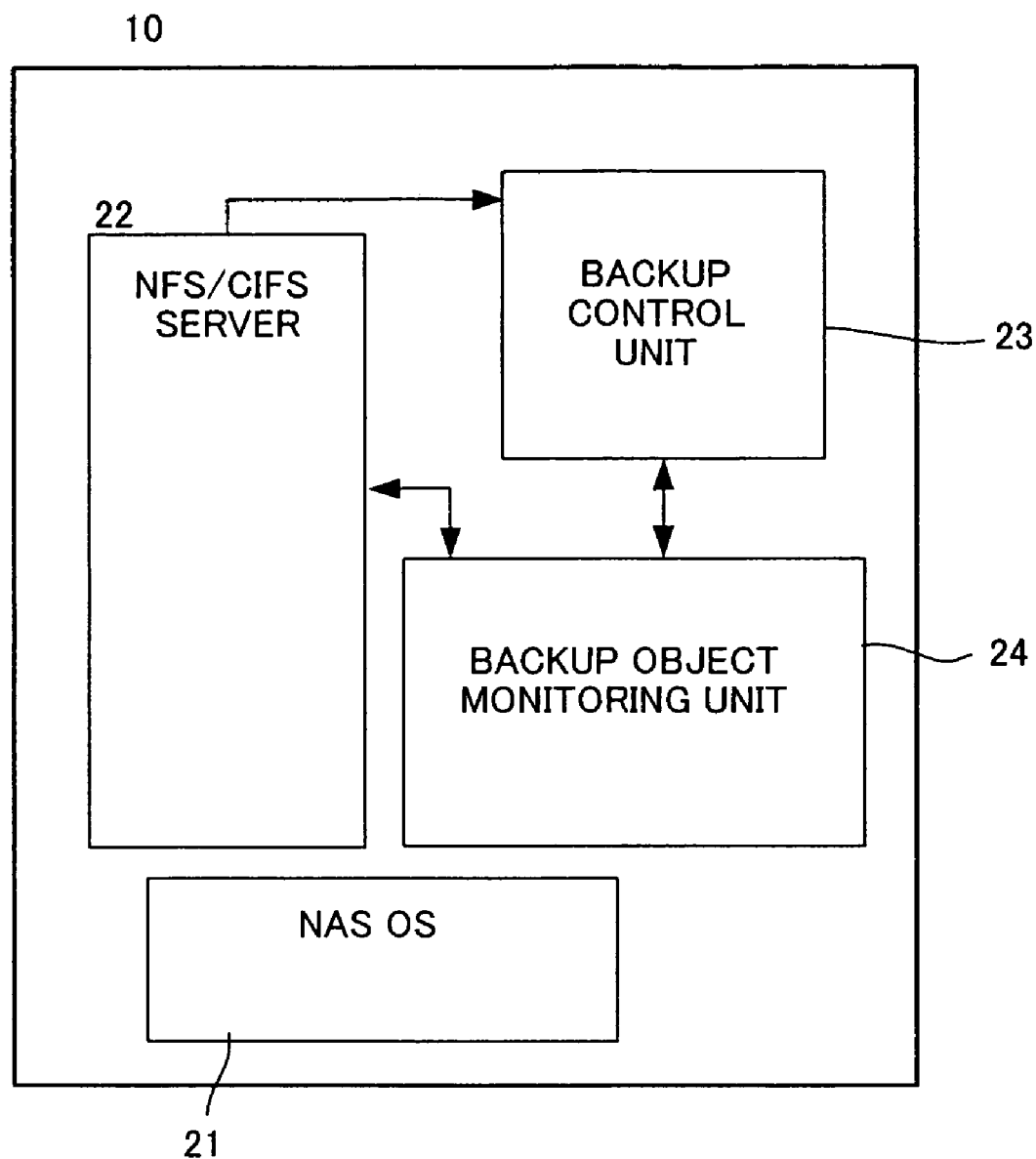
FIG. 2 is a block diagram showing a configuration of software executed by a controller of a NAS.

FIG. 1 is a block diagram showing an entire configuration of a system including a NAS (Network Attached Storage) 1 to which the present invention is applied, and FIG. 2 is a block diagram showing a software configuration of the NAS 1.

The NAS 1 includes disk drives disk drive 4 and 5, a tape drive 3, and a controller 10 which controls the disk drives 4 and 5 and the tape drive 3. Further, the NAS 1 is connected through a network 6 to a managing client computer 7 and to client computers 8A and 8B which requests the NAS 1 to write (update) and read (reference) data.

In this example, the disk drives 4 are operation disk drives subjected to the data reference and update between the client computers 8A and 8B, and the disk drives 5 and the tape drive 3 constitute a local backup system which backs up the data on the disk drives 4 by means of control programs executed by the controller 10.

The managing client computer 7 receives a command (or setting) regarding backup objects in data stored in the NAS 1 and a notification regarding backup from the NAS 1, and notifies an administrator of the received command and notification.

Further, the client computer 8A is installed with Windows (registered trademark) as an OS, and requests referencing and updating of the data stored in the NAS 1 by means of a CIFS (Common Internet File System), and the client computer 8B is installed with UNIX (registered trademark) as an OS, and requests referencing and updating of the data stored in the NAS 1 by means of an NFS (Network File System).

It should be noted that, though not illustrated, each of the managing client computer 7 and the client computers 8A and 8B includes a CPU, a memory, an interface connected to the network 6, a display device, and an input device.

The network 6 to which the NAS 1, the managing client computer 7, and the client computers 8A and 8B are connected is connected through an external network 9 to a NAS 100 and a backup system (tape drive) 101 installed at geographically different locations. These NAS 100 and backup system 101 serve as remote backup systems for the NAS 1.

As shown in FIG. 2, the controller 10 of the NAS 1 includes a backup control unit 23. In response to a command from the managing client computer 7, the backup control unit 23 backs up data on the disk drives 4 into the local backup system (composed of the disk drives 5 and the tape drive 3) or the remote backup system (the NAS 100 and the backup system 101). It should be noted that the network 6 is composed, for example, of a LAN, and the external network 9 is composed, for example, of a WAN or the Internet.

By means of operations of the control programs to be described later, the controller 10 of the NAS 1 controls input and output of data to and from the disk drives 4 according to the reference and update requests from the client computers 8A and 8B. In addition, upon receiving the update requests from the client computers 8A and 8B, the controller 10 backs up data into the disk drives 5 and the tape drive 3 as local systems or the NAS 100 and backup system 101 as remote systems according to the command from the managing client computer 7 or a preset backup procedure.

In FIG. 1, a CPU 11, a memory 12, a data transfer controller 13, a network interface 14, and an interface 15 for storages are provided in the controller 10 of the NAS 1. It should be noted that a data cache (not shown) may be provided in the memory 12, or alternatively the data cache may be provided in the data transfer controller 13.

The control programs (refer to FIG. 2) are loaded into the memory 12. The CPU 11 calls and executes the control programs, thus performing a variety of processing to be described later.

The data transfer controller 13 transfers data between the CPU 11, the network interface 14, the storage interface 15, and the memory 12.

FIG. 2 shows functional blocks of the control programs executed by the controller 10. A NAS_OS 21 manages and executes respective control programs, and the respective control programs of an NFS/CIFS server 22, the backup control unit 23, and a backup object monitoring unit 24 run under the management of the NAS_OS 21.

The NFS/CIFS server 22 receives the reference and update requests from the client computers 8A and 8B, and references and updates the data on the disk drives 4 which are the operation disk drives (file access receiving processing).

Further, as described later, the NFS/CIFS server 22 performs accumulation processing for names of the directory paths, names of the files, the number of accesses, and the number of access users with regard to access objects for which processing has been requested from the client computers 8A and 8B.

It should be noted that, here, the number of accesses represents the number of accesses (reference or update requests) made to the directory paths and the files irrespective of user IDs, and the number of access users represents the number of users who have accessed the directory paths and the files. Specifically, when one hundred accesses have been made to a certain file from ten users, the number of accesses is one hundred, and the number of access users is ten. Further, the directory paths indicate locations where data is stored in the disk drives 4, which are locations in a file system that is hierarchically structured, and the files indicate data stored in these storing locations.

Based on the command (or a preset setting) from the managing client computer 7, the NFS/CIFS server 22 issues a backup request to the backup control unit 23 upon receiving an update request from each of the client computers 8A and 8B for directory paths or files to be backed up from among the data on the disk drives 4. It should be noted that the backup request made by the NFS/CIFS server 22 is made in a mode (procedure of local backup, remote backup or the like; hereinafter referred to as a backup procedure) preset for each of the directory paths and the files.

Then, the backup control unit 23 executes the local backup or the remote backup in response to the backup request from the NFS/CIFS server 22 or the backup object monitoring unit 24 to be described later. The backup control unit 23 outputs the backup objects (names of the directory paths and files) as an execution result of the backup to a log file 230 and the like.

Based on a result of the accumulation processing of the NFS/CIFS server 22 and the execution result of the backup control unit 23, the backup object monitoring unit 24 extracts directory paths and files that are not set as the backup objects, and based on access statuses of these data not being the backup objects, determines the data (directory paths and files) to be backed up, and issues a backup request to the backup control unit 23.

Specifically, the backup object monitoring unit 24 monitors the access statuses of the client computers 8A and 8B while monitoring the backup objects and grasping backup objects set by the administrator. Thus, data having a large number of access users and a high access frequency but not being the backup object is automatically backed up.

Figure 3:
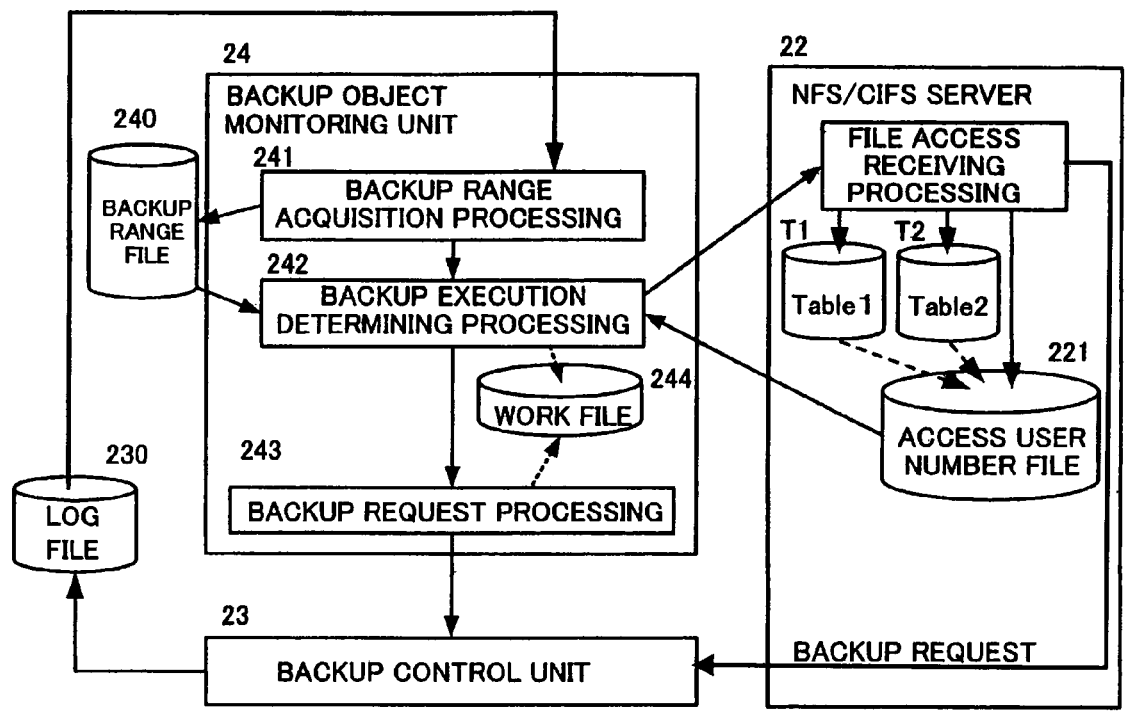
FIG. 3 is an explanatory diagram showing a processing flow with a backup object monitoring unit placed on the center.

FIG. 3 is a diagram for explaining the operations of the control programs executed by the controller 10 shown in FIG. 2. FIG. 3 shows the operations while mainly focusing on an operation of the backup object monitoring unit 24.

First, an outline of the backup processing performed by the controller 10 will be described, and the respective units will be then described in detail.

The NFS/CIFS server 22 receives the reference or update request for data (directory paths and files) from the client computer 8A or 8B, and reads or writes the requested data stored in the disk drives 4. Then, when the received request is the update request, the NFS/CIFS server 22 determines whether or not the data is a preset backup object, and when the data is the backup object, makes the backup request for the data to the backup control unit 23.

This backup request designates the backup procedure (local backup, remote backup or the like) set for each of the directory paths and the files. The backup control unit 23 writes or transfers data according to the designated backup procedure.

After executing the backup, the backup control unit 23 additionally writes the backup object (names of the directory path and file) to the log file 230. For example, as shown in FIG. 5, this log file 230 is composed of a data file in which dates and times, names of directory paths, and IDs of users who have accessed the backup object are sequentially recorded.

Meanwhile, upon receiving the reference or update request (hereinafter referred to as an access request) from the client computer 8A or 8B, the NFS/CIFS server 22 updates a table T1 which retains names of the accessed directory paths and files and the number of accesses to these directory paths and files in a manner to be described later. As shown in FIG. 8, this table T1 is one in which the names of the directory paths and the number of accesses made thereto are made to correspond to each other, and is provided in the NFS/CIFS server 22.

In a similar manner, the NFS/CIFS server 22 updates a table T2 which retains names of the users who have made the access requests and the accessed directory paths so as to make them correspond to each other. As shown in FIG. 9, this table T2 is one in which the user IDs and the names of the directory paths are made to correspond to each other, and is provided in the NFS/CIFS server 22.

Figure 11:
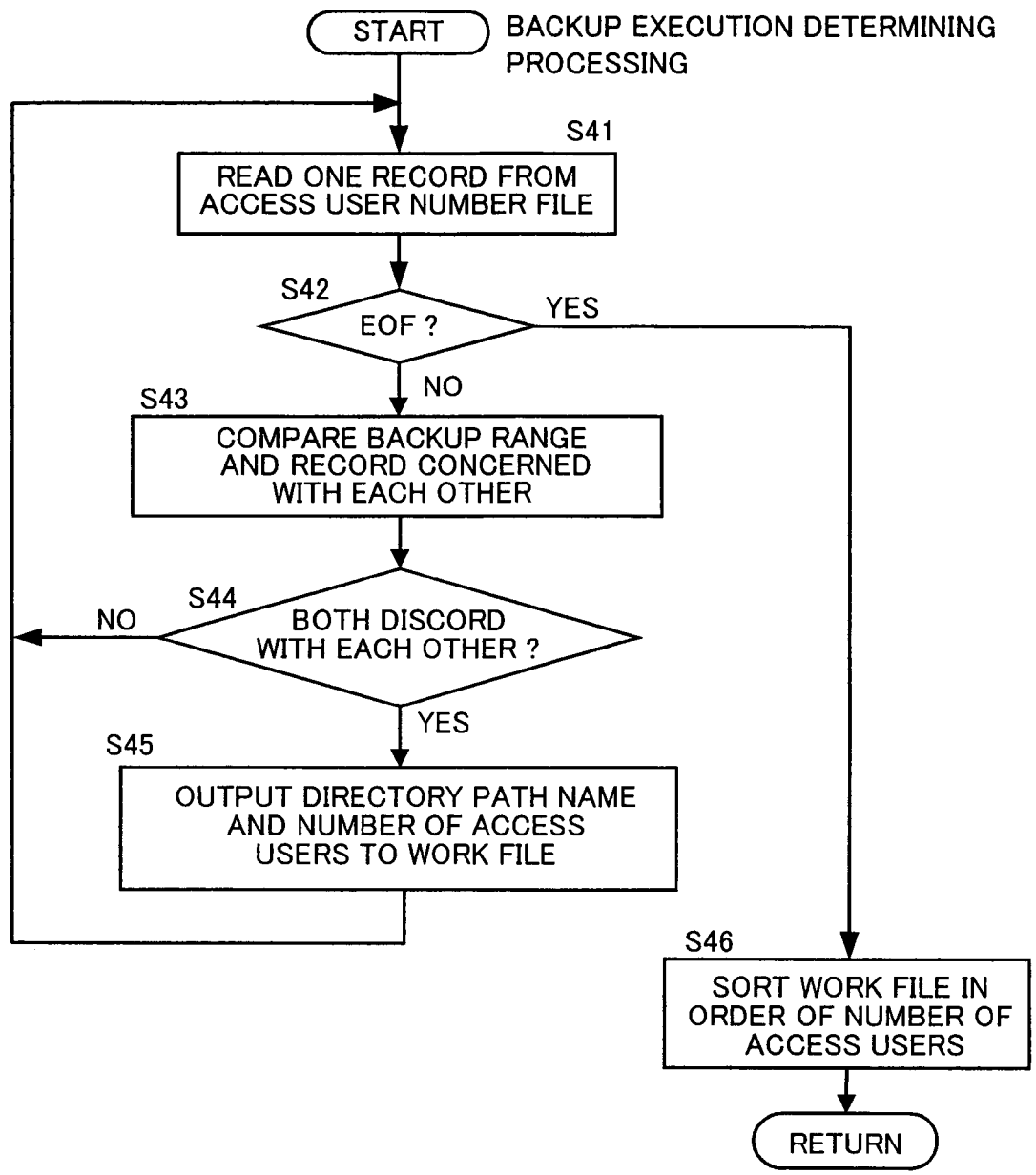
FIG. 11 is a flowchart showing an example of backup execution determining processing by the backup object monitoring unit.

As shown in FIG. 11, from the above-described tables T1 and T2 and in a manner to be described later, the NFS/CIFS server 22 accumulates the number of users who have made the accesses to each of the directory paths and the files, and creates an access user number file 221 in which the names of the directory paths and the number of access users are made to correspond to each other. It should be noted that processing for creating this access user number file 221 is performed at predetermined timing, and here, it is assumed that the processing is executed once a day.

Next, the backup object monitoring unit 24 is allowed to operate at a predetermined cycle, and here, it is assumed that the processing is executed once a day.

In FIG. 3, the backup object monitoring unit 24 executes backup range acquisition processing 241, backup execution determining processing 242, and backup request processing 243. The backup range acquisition processing 241 acquires the names of the directory paths and files, which are to be backed up, from the log file 230 of the backup control unit 23, and creates a backup object range file 240. The backup execution determining processing 242 collates the backup object range file 240 with the access user number file 221 which is created by the NFS/CIFS server 22 and indicates relationships between the names of the directory paths and files and the number of access users, and determines that the backup is to be automatically executed for the directory paths and the files that are not being the backup objects but accessed by many users. The backup request processing 243 makes a backup request to the backup control unit 23 for the above data which is not being the backup objects but determined to be backed up.

Figure 4:
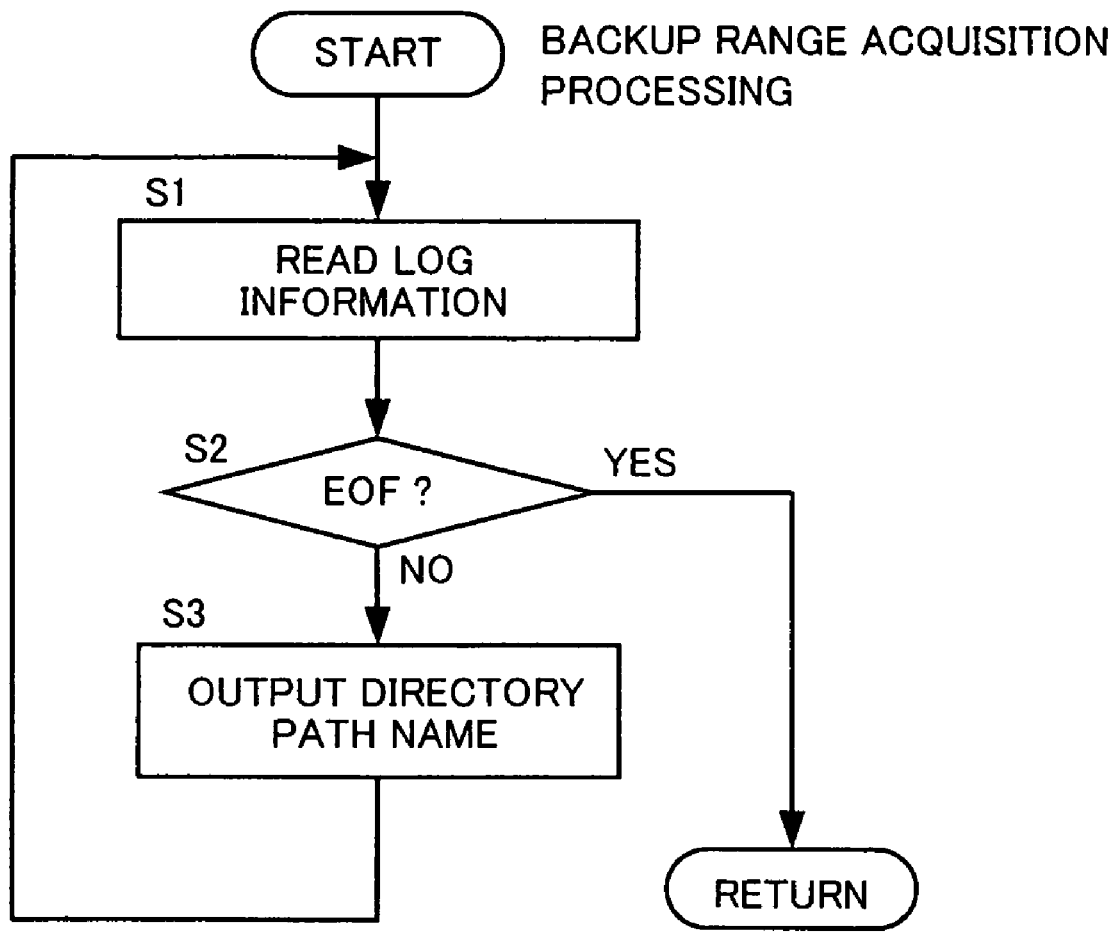
FIG. 4 is a flowchart showing an example of processing of backup range acquisition processing.

The backup range acquisition processing 241 executed by the backup object monitoring unit 24 will be described with reference to a flowchart shown in FIG. 4.

First, in S1, the log file 230 outputted from the backup control unit 23 is read every one line. Then, when the file does not come to an EOF (End Of File) in S2, the processing proceeds to S3, where the names of the directory paths are outputted to the backup object range file 240. As shown in FIG. 6, as the backup object range file 240, data is created, which indicates a list of directory paths and files that are the backup objects predesignated by the managing client computer 7 and have been actually backed up, from among the directory paths and the files that have been accessed from the client computers 8A and 8B.

Figure 7:
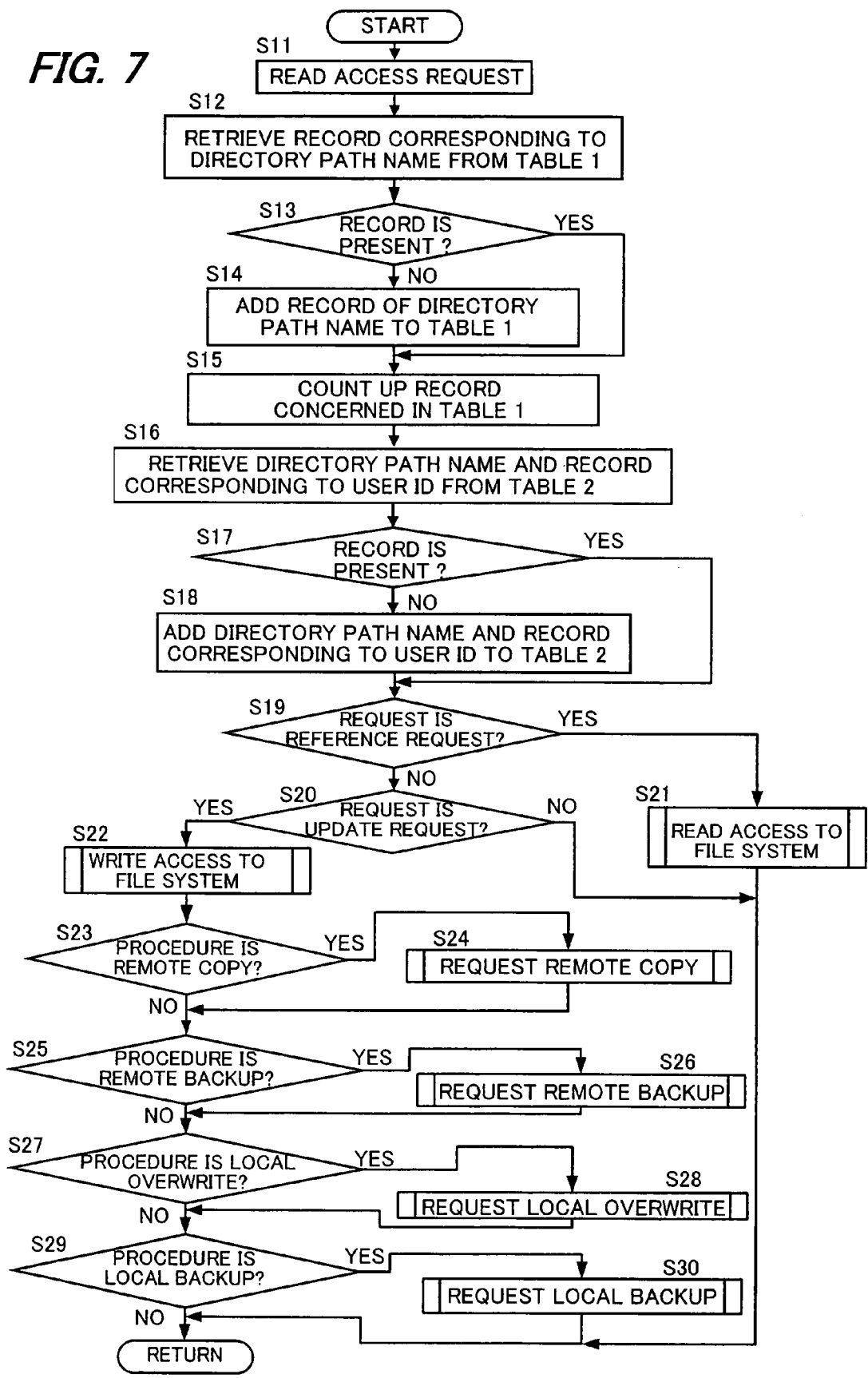
FIG. 7 is a flowchart showing an example of processing performed by an NFS/CIFS server.
Figure 10:
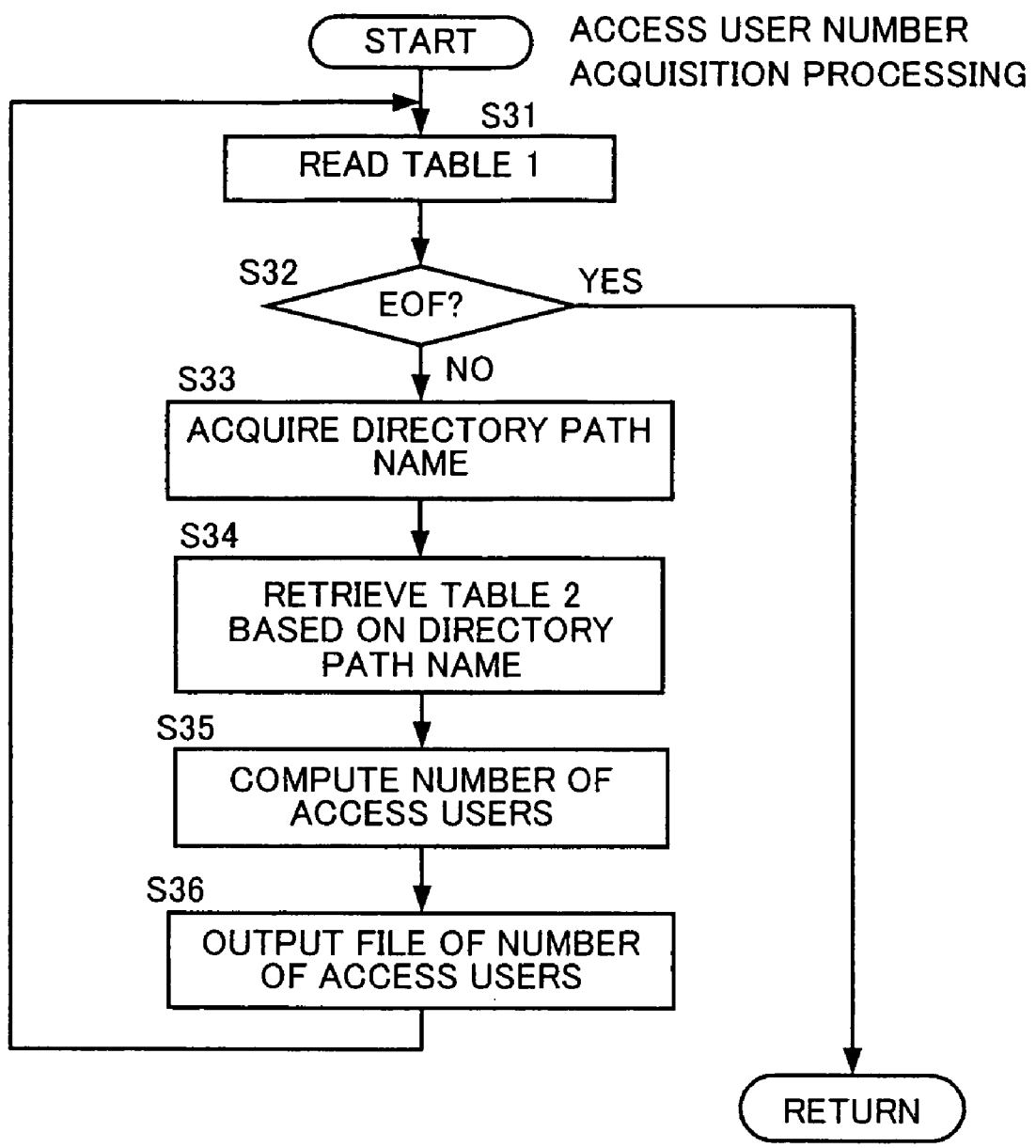
FIG. 10 is a flowchart showing an example of access user number acquisition processing performed by the NFS/CIFS server.

Next, the creation of the access user number file 221 for use in the backup execution determining processing 242 will be described while referring to FIGS. 7 to 10. It should be noted that flowcharts of FIGS. 7 and 10 show processing executed by the NFS/CIFS server 22. The processing in flowchart of FIG. 7 is executed when the NAS 1 has been accessed from the client computers 8A and 8B, and the flowchart of FIG. 10 is executed in response to a request from the backup object monitoring unit 24.

In S11 of FIG. 7, the names of the directory path and file and the user ID are acquired from the access request (reference or update request), and in S12, the name of the directory path concerned is retrieved from the table T1.

In S13, it is determined whether or not the name of the directory path for which the accesses has been requested is present in the table T1, and when the name of the directory path is not present therein, a record of the name of the directory path concerned is added to the table T1 in S14.

In S15, a counter for the number of accesses (an access counter of FIG. 8) of the record of the name of the directory path concerned retrieved in S12 or added in S14 is incremented. In this way, the number of accesses for each directory path is updated.

Next, in S16, a record of an ID of a user who makes an access at present and a name of a directory path accessed at present is retrieved from the table T2 indicating the correspondence between the IDs of the users who have made the accesses and the names of the accessed directory paths. In S17, it is determined whether or not the corresponding record is present, and when the record concerned is not present, the ID of the user who makes the access at present and the name of the directory path accessed at present are added to the table T2 in S18.

The tables T1 and T2 are updated in this way, and file operations according to the access request are then performed in S19 and the subsequent steps.

In S19, it is determined whether or not the access request is a reference request, and when the request is the reference request, the processing proceeds to S21, where a file of the requested directory path is read. Then, the processing ends.

In S20, it is determined whether or not the access request is an update request, and when the request is the update request, the processing proceeds to S22, where a file of the requested directory path is written to each disk drive 4.

Next, in S23, it is determined whether or not the backup procedure preset for the file (or the directory path) concerned is remote copy, and when the procedure is the remote copy, the processing proceeds to S24, where the backup control unit 23 is requested to copy the file concerned to the NAS 100.

Next, in S25, it is determined whether or not the backup procedure preset for the file concerned is remote backup, and when the procedure is the remote backup, the processing proceeds to S26, where the backup control unit 23 is requested to copy the file concerned to the backup system 101.

Next, in S27, it is determined whether or not the backup procedure preset for the file concerned is local overwrite, and when the procedure is the local overwrite, the processing proceeds to S28, where the backup control unit 23 is requested to copy the file concerned to each disk drive 5.

Next, in S29, it is determined whether or not the backup procedure preset for the file concerned is local backup, and when the procedure is the local backup, the processing proceeds to S30, where the backup control unit 23 is requested to back up the file concerned into the tape drive 3.

In this way, when the access request is the update request, after writing to the disk drives 4 as operation disks is performed, the backup control unit 23 is requested to perform the processing according to the backup procedures set for each of the directory paths and the files.

Figure 15:
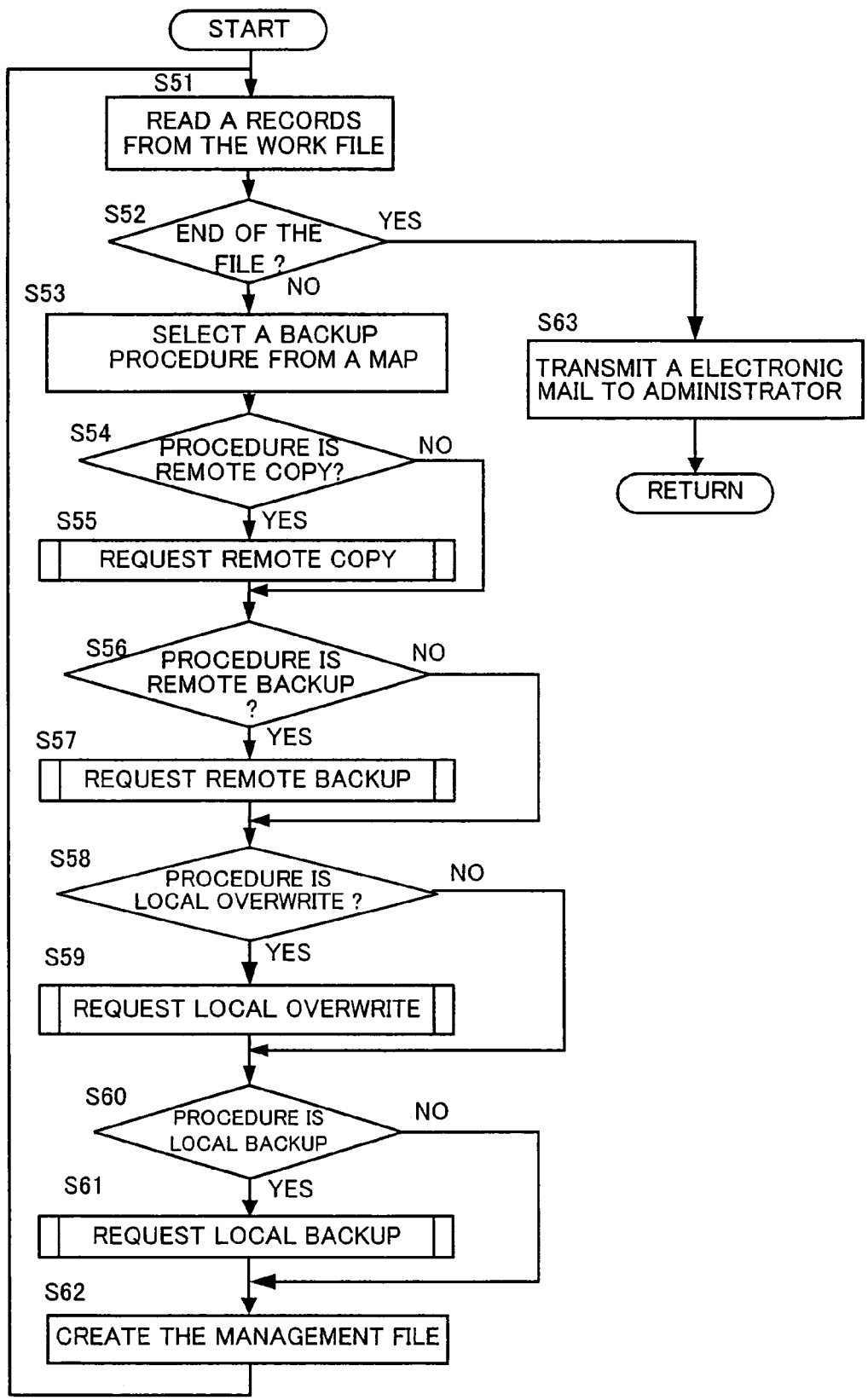
FIG. 15 is a flowchart showing an example of backup request processing performed by the backup object monitoring unit.

It should be noted that, as shown in FIG. 15, the backup procedures are classified into the following four types.

Remote copy+Remote backup
Local overwrite+Remote backup
Remote backup
Local backup Those backup procedures may be set in advance according to the importance and the like of the respective directory paths and files.

The above-described processing of FIG. 7 updates the table T1 which saves the number of accesses for each of the directory paths and the files to the one as shown in FIG. 8, and updates the table T2 which saves the IDs of the users who have made the accesses and the accessed directory paths to the one as shown in FIG. 9, and the data in the disk drives 4 is referenced or updated according to the access request. Then, when the request is the update request, the backup request is issued to the backup control unit 23 according to a predetermined backup procedure, and the backup is performed.

Next, processing for acquiring the number of access users, which is performed by the NFS/CIFS server 22, will be described with reference to the flowchart of FIG. 10.

This processing is activated by the NFS/CIFS server 22 based on a request from the backup object monitoring unit 24.

First, in S31 of FIG. 10, the table T1 is read from the first record one by one, and when the file does not come to the EOF (End Of File) in S32, the processing proceeds to S33, where the names of the directory paths are acquired from the read records.

In S34, a search is made through the table T2 based on the names of the directory paths acquired in S33, and in S35, user IDs which match these directory paths are accumulated, and the numbers of access users is thus obtained for each of the directory paths.

Then, in S36, as shown in FIG. 12, the access user number file 221 is outputted which provides corresponding numbers of access users for each directory path. It should be noted that, as shown in FIG. 13, in place of the numbers of access users, ratios (access ratios) may be obtained by dividing the numbers of access users by the total number of accesses, and the access user number file 221 may provide the correspondence between the names of the directory paths and the access ratios. It should be noted that FIG. 13 shows the case where the total number of accesses which is the total value of the numbers of accesses in the table T1 is 1,000.

By the above processing, the NFS/CIFS server 22 creates the access user number file 221 in which the numbers of access users as obtained from the tables T1 and T2 for each of the directory paths are accumulated.

Next, the backup execution determining processing 242 of FIG. 3 will be described while referring to a flowchart of FIG. 11. It should be noted that the backup execution determining processing 242 sends out a request that the NFS/CIFS server 22 create the above-described access user number file 221, and executes the processing of the flowchart of FIG. 11 at the time when the creation of the access user number file 221 of FIG. 10 is complete.

First, in S41, the access user number file 221 created by the NFS/CIFS server 22 is read from the first record one by one, and when the file does not come to the EOF in S42, the processing proceeds to S43. In S43, a comparison is made as to whether or not the directory paths in the access user number file 221 are present in the backup object range file 240 created as shown in FIG. 4.

In S44, when the name of the directory path acquired from the corresponding record in the access user number file 221 is not present in the backup object range file 240, the processing proceeds to S45. Meanwhile, when the name of the directory path of the record concerned matches a name of the directory path in the backup object range file 240, the directory path of the record is the directory path within the backup object range set by the managing client computer 7. Accordingly, the processing returns to S41, and the next record is read.

When the name of the directory path of the record concerned does not match the name of the directory path in the backup object range file 240, the file of the directory path is a file which has been accessed by the client computer 8A or 8B but is not included in the backup object range. In this case, in S45, in order to set the file as an object to be automatically backed up, the name of the directory path of the file and the number of access users thereof are outputted to a work file 244. This work file 244 is outputted in a format shown in FIG. 14; although the work file 244 is similar to the access user number file 221 shown in FIG. 12, it is different therefrom in that each record of the work file 244 is composed of the names of the directory paths which are not stored in the backup object range file 240.

When the access user number file 221 comes to an end, the processing proceeds from S42 to S46, where the created work file 244 is sorted in the order (for example, the descending order) of number of access users. Then, the processing ends.

As a result, the work file 244 of FIG. 14 becomes a file in which the names of the directory paths of the backup object range file 240 as shown in FIG. 6 are subtracted from the access user number file 221 shown in FIG. 12 and the result is sorted in the order of the number of access users.

Next, the backup object monitoring unit 24 executes the backup request processing 243 after the end of the above-described backup execution determining processing 242.

This backup request processing 243 will be described while referring to a flowchart of FIG. 15.

In S51, the records are read from the work file 244 one by one. In S52, when the file does not come to the EOF, the processing proceeds to S53, where a backup procedure corresponding to the sorting order of the work file 244 is selected from a map shown in FIG. 16. In this map of FIG. 16, the backup procedures are set in the descending order of importance (in columns of a symbol # in the map). For the most important files (directory paths), the remote copy and the remote backup (which are disaster recovery) are performed, and for the second important files, the local backup (local overwrite in the map) is performed. Moreover, for the third important files, only the remote backup is performed. In a similar manner, for the fourth important files, only the local backup is performed. For the fifth important files and the subsequent files, no backup is performed.

In this example, the work file 244 is sorted in the descending order of the number of access users. Accordingly, description will be made of the case of assigning the backup procedures set in the map of FIG. 16 according to the orders in the work file 244.

First, the remote copy and the remote backup are set for the file (directory path) accessed by the largest number of users in the work file 244 shown in FIG. 14 because the file concerned is presumably the most important. Next, for the file accessed by the second largest number of users, the local overwrite and the remote backup, which are performed for the second important files, are set. For the file accessed by the third largest number of users, the remote backup is set, and in a similar manner, for the file accessed by the fourth largest number of uses, the local backup is set. It should be noted that, for the file accessed by the fifth largest number of users and onward, no backup is performed.

As described above, the backup procedures corresponding to the orders in the map of FIG. 16 are set according to the orders of the sorted files in the work file 244. Thereafter, in S54 to S61, the remote copy, the remote backup, the local overwrite, and the local backup are requested to the backup control unit 23 according to the selected backup procedures.

Then, in S62, the name of the directory path which has requested the backup is outputted to a management file, and then the processing proceeds to S51, where the next record is read. It should be noted that the format of the management file is similar to that of the backup object range file 240, and the name of the directory path for which the backup has been requested is stored in the management file. However, the management file is different from the backup object range file 240 in that the names of the directory path in the management file are not included in the backup object range.

After the read of the work file 244 is finished, the processing proceeds from S52 to S63. In S63, the management file created in S62 is attached to an electronic mail and transmitted to a preset administrator. Then, the processing ends.

By the above processing, as shown in FIG. 14, for the files accessed by many users but not included in the backup object range set by the administrator, the backup procedures set in the map of FIG. 16 in the descending order of the number of access users. Then, as shown in FIG. 17, the files are automatically backed up, and further, the result of each backup is transmitted to the administrator by electronic mail. Therefore, even the files and the directory paths that are not the backup objects due to setting omission and the like can also be backed up according to user access frequencies.

Moreover, even those files for which backup is not initially intended can be backed up, and files required by the user can be backed up more reliably according to the backup procedures set in correspondence with the importance of the files, thus making it possible to enhance redundancy of the NAS 1.

It should be noted that, with regard to the files for which has been requested in the backup request processing 243 and which have been backed up in the backup control unit 23, the directory paths thereof are outputted to the log file 230.

Hence, in the next backup range acquisition processing 241, the directory paths described in the log file 230 are determined to be included in the backup object range. Accordingly, at the next execution by the backup object monitoring unit 24, files other than the top four most important files shown in FIG. 17 can be backed up, and a greater number of files which are not included in the backup object range can be backed up.

It should be noted that a notification of the directory paths and the files that are not included in the set backup object range and have automatically been backed up may be transmitted to the managing client computer 7 by SNMP (Simple Network Management Protocol) instead of electronic mail.

Second Embodiment

Figure 18:
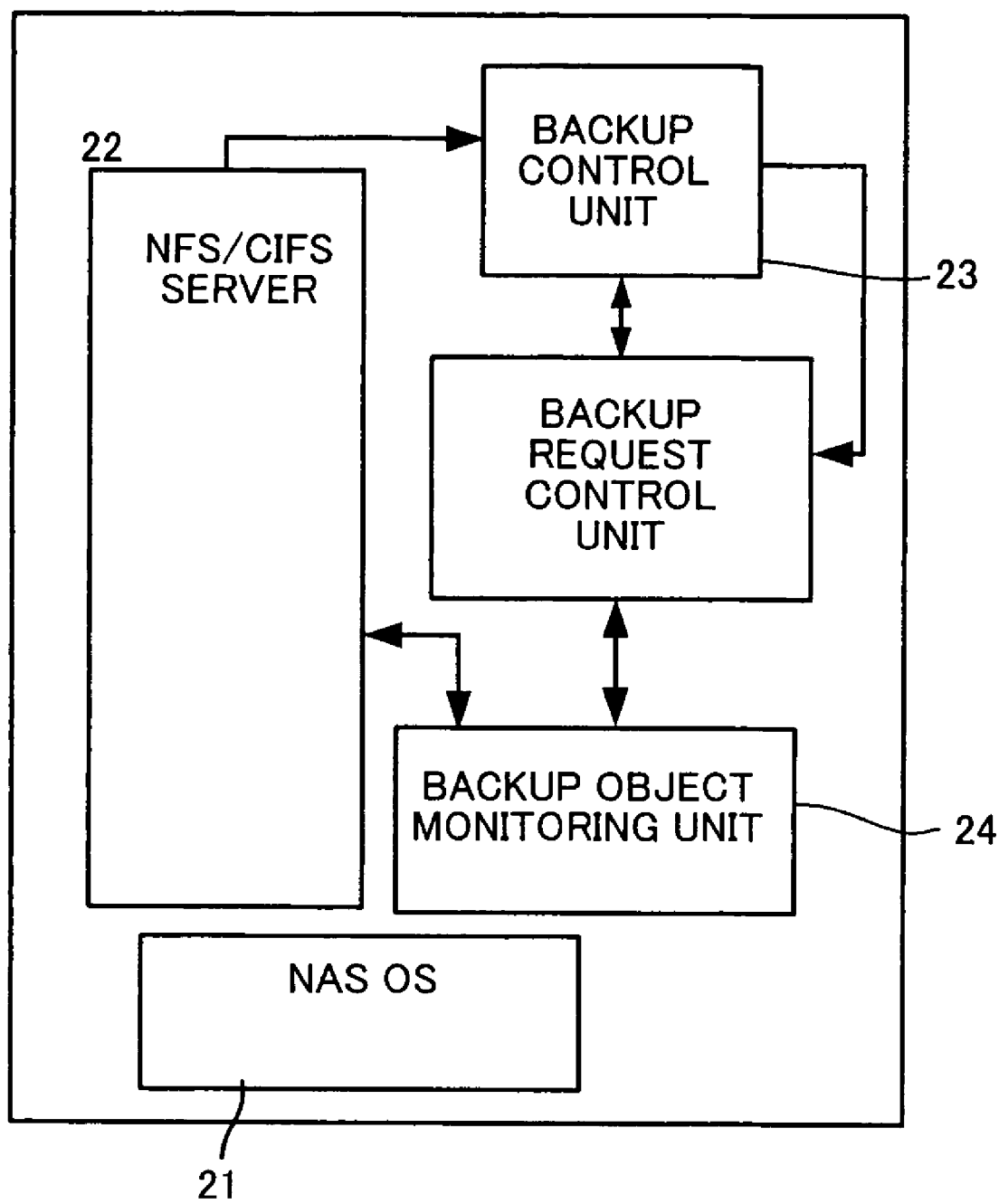
FIG. 18 shows a second embodiment, and is a block diagram showing a configuration of software executed by a controller of a NAS.

FIGS. 18 to 22 show a second embodiment. As shown in FIG. 18, a controller 10 of a NAS 1 of the second embodiment includes a backup request control unit 25 which controls the backup request based on a load on the CPU 11 (refer to FIG. 1) of the NAS 1 between the backup object monitoring unit 24 and the backup control unit 23, which are shown in the first embodiment. The second embodiment is configured such that the backup object monitoring unit 24 issues the backup request to the backup control unit 23 through the backup request control unit 25.

Figure 19:
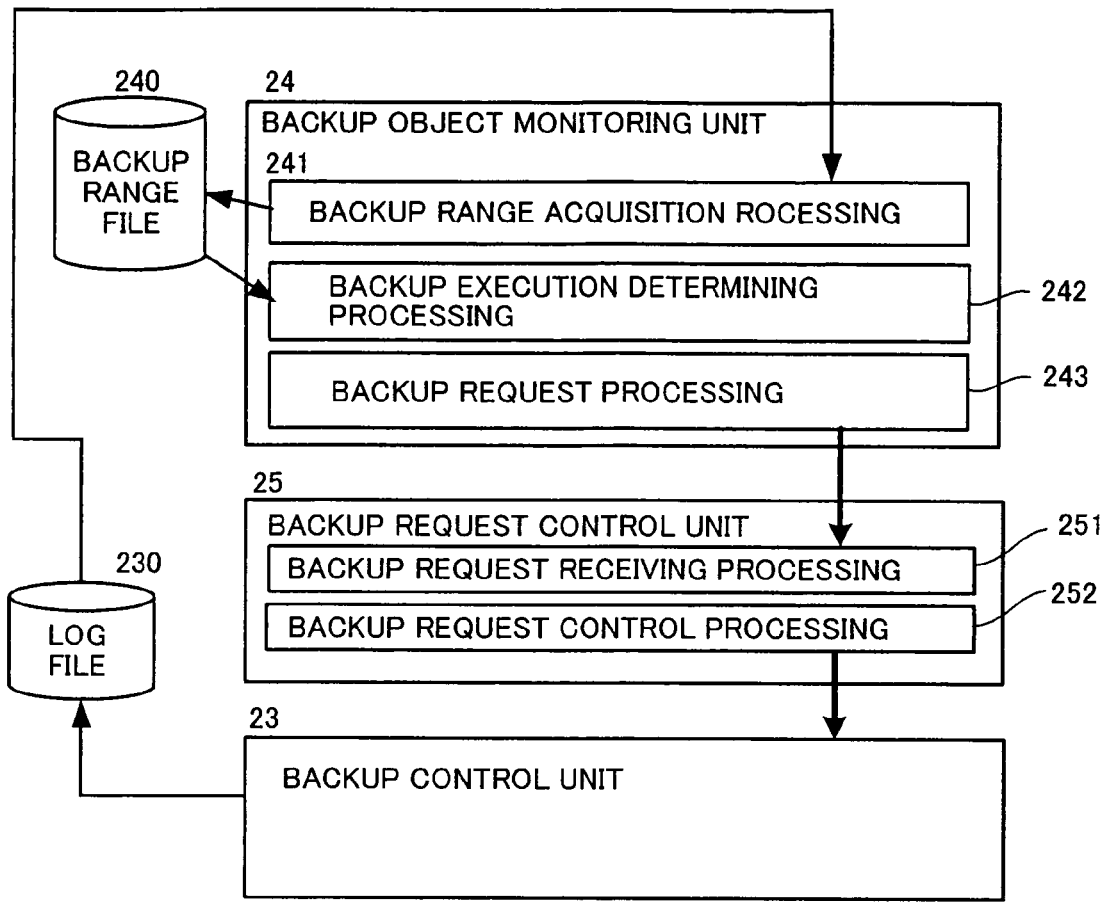
FIG. 19 is an explanatory diagram showing a processing flow with a backup object monitoring unit placed on the center according to the second embodiment.

As shown in FIG. 19, backup range acquisition processing 241 and backup execution determining processing 242 of the backup object monitoring unit 24 are similar to those of the first embodiment. In the backup object monitoring unit 24, backup objects set by a managing client computer 7 are acquired from a log file of the backup control unit 23 to create a backup object range file 240, and the backup object range file 240 is compared with an access user number file 221 from an NFS/CIFS server 22 to extract directory paths which are not recorded in the backup object range file 240 to a work file 244. Then, the directory paths extracted to the work file 244 are ranked according to the numbers of access users, and a backup processing request is sent to the backup request control unit 25 by backup request processing 243.

Figure 20:
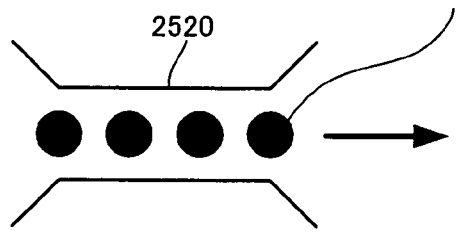
FIG. 20 is an explanatory diagram showing an example of a backup request control unit according to the second embodiment.

The backup request control unit 25 is provided with a processing cue 2520 shown in FIG. 20. The backup request control unit 25 executes backup request receiving processing 251 for receiving the backup processing request from the backup request processing 243 of the backup object monitoring unit 24 and accumulating the received backup processing request in the processing cue 2520, and backup request control processing 252 for monitoring a usage rate (processing load) of the CPU 11, taking the processing request out of the processing cue 2520 when the processing load is lowered to a predetermined threshold value or more, and issuing the backup request to the backup control unit 23. It should be noted that the processing request inputted to the processing cue 2520 includes a backup object directory path and a backup procedure.

Here, there is a possibility that the directory path requested to be processed is updated while being accumulated in the processing cue 2520. In this connection, the backup request control unit 25 creates a snapshot of the directory path concerned at the time of receiving the processing request from the backup object monitoring unit 24, and executes the backup for the backup control unit 23 based on the snapshot. In this point, the second embodiment is different from the first embodiment.

An operation of the backup request control unit 251 will be described below with reference to flowcharts of FIGS. 21A, 21B, and 22.

Figure 21A:
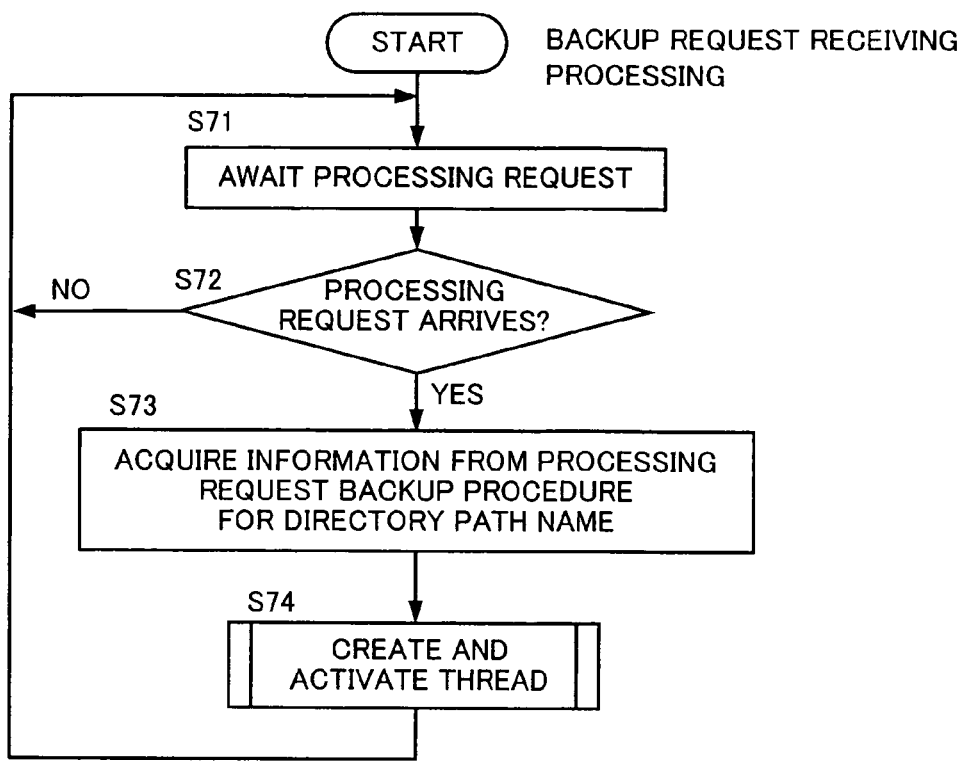
Figure 21B:
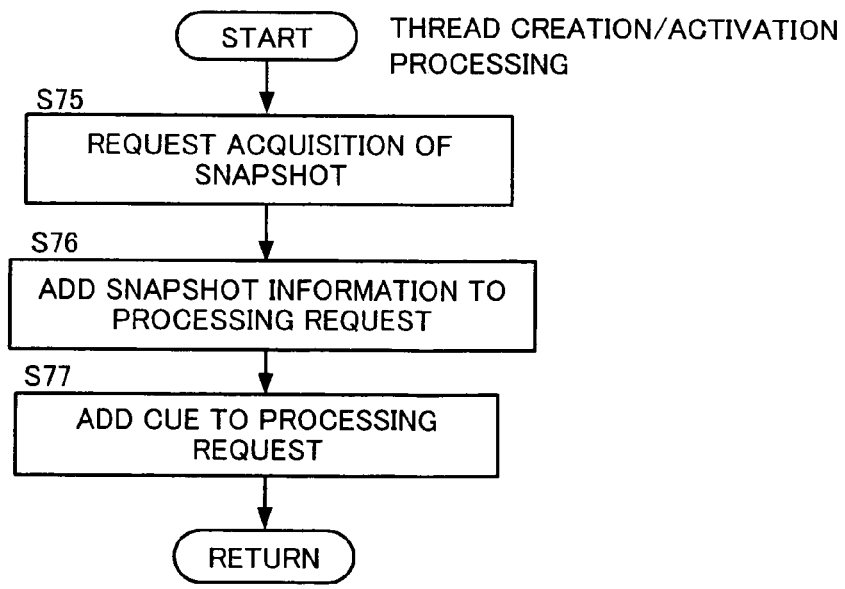
Figure 22:
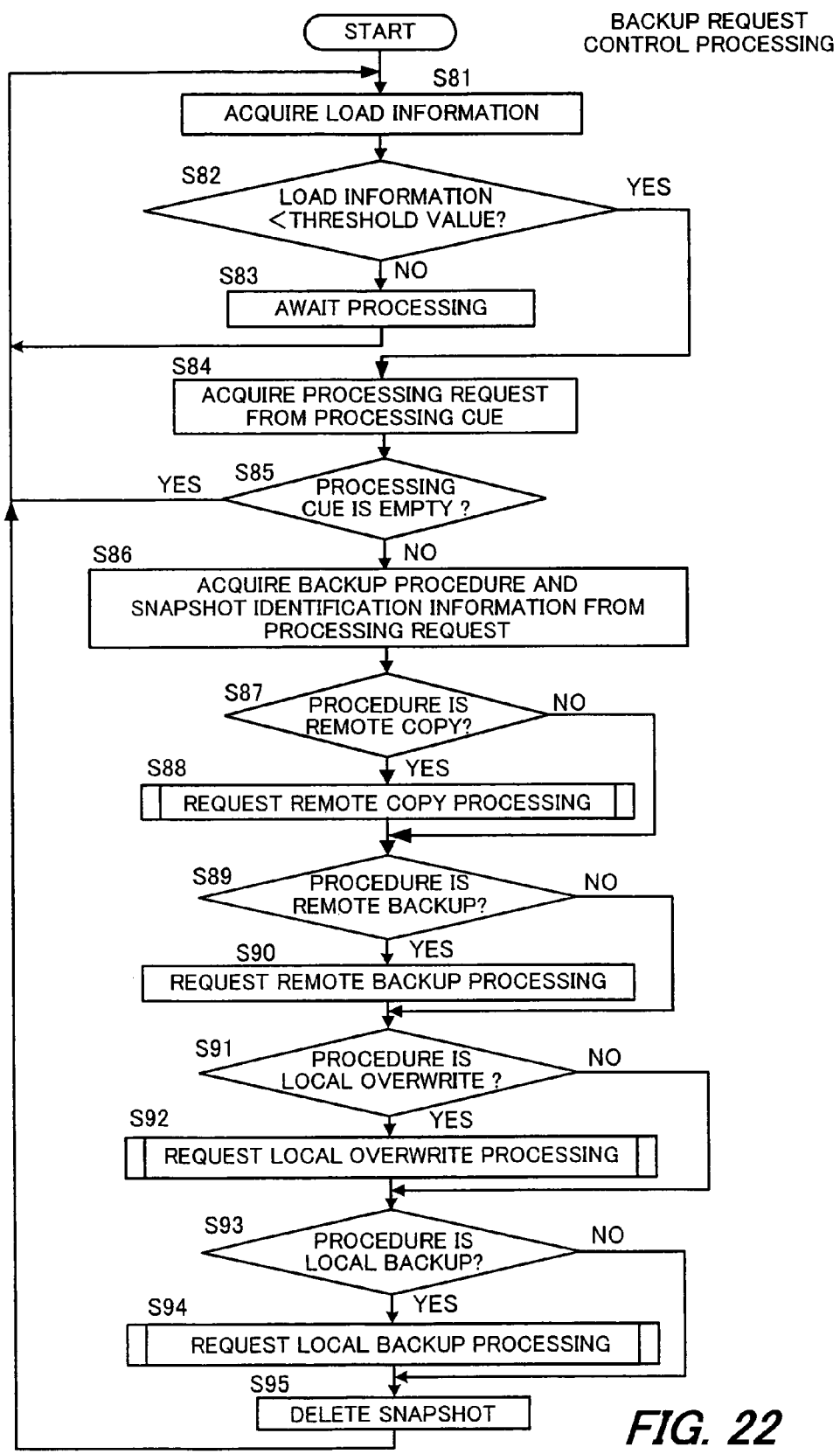
FIG. 22 is a flowchart showing an example of backup request control processing of the backup request control unit according to the second embodiment.

FIGS. 21A and 21B show the processing of the backup request receiving processing 251. FIG. 21A shows a main routine (a process or a task) of the backup request receiving processing, and FIG. 21B shows processing for a thread created from the main routine.

First, in S71 and S72 of FIG. 21A, the processing request from the backup object monitoring unit 24 is awaited, and when the processing request arrives, the main routine proceeds to S73, where the processing request is analyzed to acquire the directory path for which the backup is executed and the backup procedure set according to the orders as shown in FIG. 16.

Then, in S74, the snapshot of the directory path to be backed up is created, and the thread which inputs the processing request to the processing cue 2520 is activated. Thereafter, the main routine returns to S71, where the next processing request is awaited.

The thread activated in S74 executes processing of FIG. 21B. First, in S75, a request is issued to a NAS_OS 21 to create the snapshot of the directory path created in S73.

Next, in S76, identification information (a name of a file system and the like) of the snapshot is created from the NAS_OS 21. Then, this identification information of the snapshot is added to the processing request, and thereafter, in S77, the processing request is added to the processing cue 2520.

Next, details of the backup request control processing 252 will be described with reference to the flowchart of FIG. 22.

First, in S81, load information (usage rate of the CPU and the like) is acquired from the CPU 11 of the NAS 1. In S82, when the load information is equal to or lower than the preset threshold value, the processing proceeds to the backup request processing in S84 and the subsequent steps. Otherwise, the processing proceeds to S83, where a predetermined waiting time is interposed, and thereafter, the processing returns to S81, where a lowering of the load on the CPU 11 is awaited.

Meanwhile, in S84 where the load on the CPU 11 is lowered to the predetermined threshold value or less, the processing request is acquired from the processing cue 2520. In S85, when the processing cue 2520 is not empty, the processing proceeds to S86, where the backup procedure and the snapshot identification information, which are included in the processing request, are created.

Then, in S87 to S94, the snapshot created by the NAS_OS 21 is subjected to the backup processing including the remote copy, the remote backup, the local overwrite, and the local backup based on the preset backup procedure.

After the backup is complete, a request is issued to the NAS_OS 21 to delete the snapshot (S95), and the processing ends. Then, the processing returns again to S81, where the next processing is awaited.

As described above, the automatic backup of the file not included in the backup object range is prohibited when the load on the NAS 1 is high (the usage rate of the CPU 11 is high), and the above-described automatic backup is performed at the time when the load on the NAS 1 is lowered to the threshold value or less. Accordingly, the files and the directory paths, which are not the backup objects due to setting omission thereof by the administrator, can also be backed up according to the access frequencies of the users while preventing an overload on the NAS 1.

Moreover, timing of the automatic backup depends on the load on the NAS 1, and accordingly, the use of the snapshot makes it possible to certainly back up a file at the time when the backup request processing 243 of the backup object monitoring unit 24 determines to perform the backup.

It should be noted that, although the request from the backup object monitoring unit 24 is executed by the backup control unit 23 when the load on the NAS 1 is equal to or lower than the predetermined threshold value in the above description, a point of time when the load on the NAS 1 passes through a peak thereof and is lowered to the predetermined threshold value or less may be set as the timing of executing the automatic backup.

FIRST MODIFIED EXAMPLE

In the respective embodiments described above, the backup object monitoring unit 24 determines the files to be automatically backed up, which are not included in the backup object range, according to the numbers of access users for each of the directory paths accumulated for each of predetermined periods. However, variations of the numbers of access users are monitored, and the automatic backup may be performed for files in which the variations of the numbers of access users are large.

Specifically, the NFS/CIFS server 22 compares the access user number file 221 in which the numbers of access users for each of the directory paths are accumulated as shown in FIG. 12 with a result of an accumulation performed the last time. Moreover, the NFS/CIFS server 22 obtains values calculated by subtracting the numbers of access users of the last time from the numbers of access users of this time for each of the directory paths. Then, as shown in FIG. 23, an access user number variation file 221A is created by computing differences between the numbers of access users.

Next, the backup execution determining processing 243 of the backup object monitoring unit 24 outputs the access user number variation file 221A which lists the directory paths that are not the backup objects set by the administrator in a similar manner to the above to a work file 244A as shown in FIG. 24, where the variations of the numbers of access users are sorted in a descending order.

Then, directory paths in which the numbers of access users have increased as compared with those in the previous processing are set in upper orders in the work file 244A. For example, as shown in FIG. 24, a directory path "/share/ cifs.share9" which ranks second in the number of access users in FIG. 14 becomes the first in the variation of the number of access users.

Accordingly, a backup procedure to be assigned to the directory path concerned becomes the disaster recovery (remote copy and remote backup) which is the highest in importance in the table shown in FIG. 16, and a priority order of the directory path concerned in the backup is raised. Such backup procedures are set for the respective directory paths in the work file 244A, and the backup requests are issued to the backup control unit 23. It should be noted that the current access user number file 221 is replaced by the previous access user number file, and the next processing is awaited.

Therefore, the file in which the number of access users has radically increased is set as the object to be automatically backed up. Thus, even when an important file is created in a directory path in which the important file has not been assumed to be created at first and the users come to access the file, the backup can be performed certainly for the file, and the redundancy of the NAS 1 can be enhanced.

It should be noted that, although the variations of the numbers of access users are used in this modified example, the automatic backup objects may also be determined based on variations of the numbers of accesses for each of the directory paths.

SECOND MODIFIED EXAMPLE

In the respective embodiments described above, the backup object monitoring unit 24 sets the backup procedures of the automatic backup objects according to the orders of the files in the work file 244 in which the files are sorted in the descending order of the number of access users. However, the backup procedures may also be set according to the numbers of access users to the work file 244.

For example, the backup procedures are set in the following manner.

When the number of access users is equal to or more than 100, the remote copy and the remote backup are performed.

When the number of access users ranges from 51 to 99, the local overwrite and the remote backup are performed.

When the number of access users ranges from 11 to 50, the remote backup is performed.

When the number of access users ranges from 2 to 10, the local backup is performed.

In such a manner, among the files stored in the NAS 1, the files to be automatically backed up can be increased, and the redundancy of the NAS 1 can be further enhanced.

It should be noted that, also in the above-mentioned first modified example, the backup procedures of the automatic backup objects may be set according to the variation ranges of the numbers of access users as in the above-description.

THIRD MODIFIED EXAMPLE

In the respective embodiments described above, the backup object monitoring unit 24 sets the backup procedures of the automatic backup objects according to the orders of the files in the work file 244 in which the files are sorted in the descending order of the number of access users. However, the backup procedures may also be set according to attributes of the directory paths and the numbers of access users.

For example, it is satisfactory if directory paths set to be shared in terms of attributes are set in higher orders in the importance of the backup procedures, and if directory paths to be fully accessed in terms of the attributes in the same way are sorted so as to be placed in the higher orders in the importance of the backup procedures.

Particularly, it is difficult for the administrator to assume what kind of files will be stored in the directory paths set to be shared. Accordingly, the importance in the backup procedures is raised for the directory paths set to be shared, thus making it possible to certainly back up important files which are excluded from the assumption of the administrator.

FOURTH MODIFIED EXAMPLE

In the respective embodiments described above, the backup object monitoring unit 24 automatically backs up the files excluded from the setting of the administrator for each predetermined period (one day). However, the variations of the numbers of access users, which are shown in the first modified example, may be monitored for each predetermined time (for example, every 60 minutes), and at the time of detecting a directory path in which the variations (incremental value) of the number of access users exceed a predetermined threshold value is detected, the automatic backup (backup request to the backup control unit 23) may be executed.

For example, the backup object monitoring unit 24 executes the backup range acquisition processing 241 and the backup execution determining processing 243 for each predetermined cycle (for example, every one hour). As in the first modified example, in response to the request of the backup execution determining processing 243, the NFS/CIFS server 22 creates the access user number file 221, obtains the variations of the numbers of access users based on a difference between the access user number file 221 and the previous access user number file, and creates the access user number variation file 221A.

Then, when there is a directory path in which the variation of the number of access users exceeds the predetermined threshold value, the backup procedure is set and the backup request is issued to the backup control unit 23 in such a manner as described above. After this backup is complete, the previous and current access user number files 221 are deleted, and accumulation is performed afresh from the next processing. This is because the deletion of the access user number files 221 makes it possible to prevent the backup object monitoring unit 24 from frequently issuing the backup requests to the backup control unit 23.

Accordingly, the backup request is issued at the time when the incremental value of the number of access users per unit time exceeds the predetermined threshold value, thus making it possible to accurately back up the file to which accesses have radically increased in the directory path excluded from the assumption of the administrator.

Figure 25:
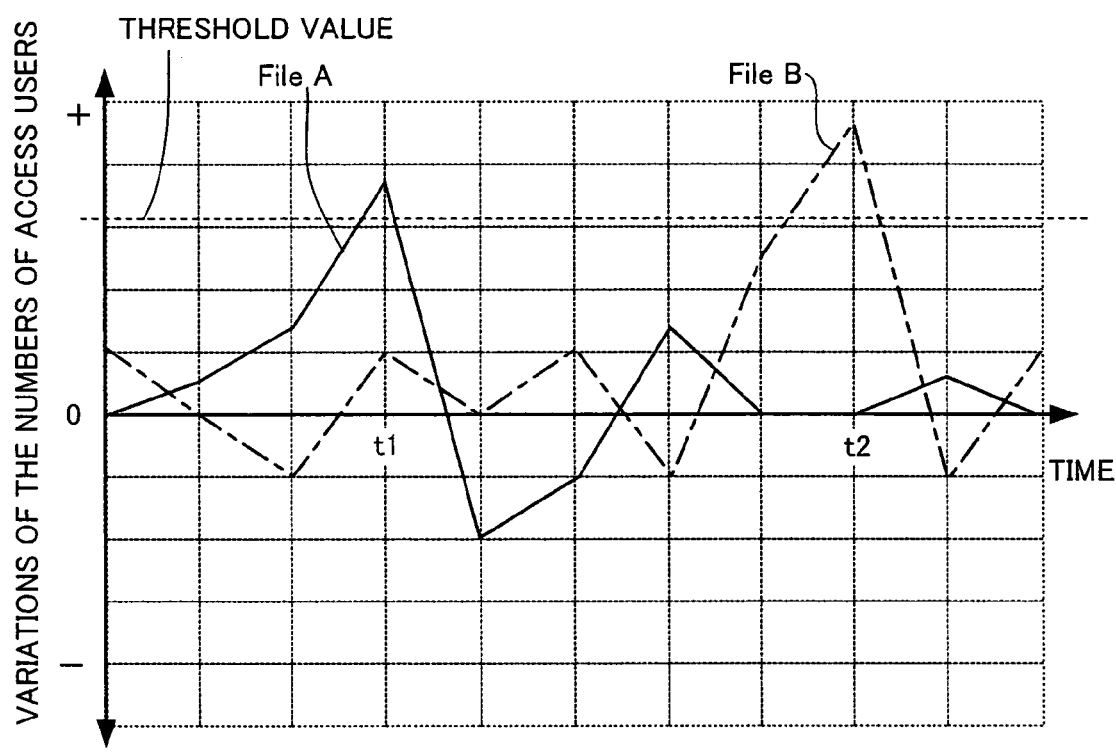
FIG. 25 shows a fourth modified example, and is a graph showing variations of the numbers of access users and pieces of backup timing, showing relationships between the variations of the numbers of access users and a time.

For example, as shown in FIG. 25, when the variation of the number of access users to a file A exceeds the predetermined threshold value at a time t1 at the end of a predetermined cycle, files (including the file A) in the work file 244A, which are not set as the backup objects by the administrator, are automatically backed up. After the backup request is executed, the access user number files 221 are deleted, and at the next time of executing the backup object monitoring unit 24, it is determined for each predetermined cycle whether or not the backup is to be executed based on the access user number files 221 accumulated afresh.

Then, when a variation of the number of access users to a file B exceeds the predetermined threshold value at a time t2, as in the above description, the automatic backup is executed for the files not being the backup objects, and thereafter, the access user number files 221 and the tables T1 and T2 are deleted.

Thus, according to the use conditions of how the users use the client computers 8A and 8B, the automatic backup objects can be detected at the optimum timing, and the backup can be executed.

Although the point of time when the variation of the number of access users exceeds the predetermined threshold value is set as the timing of executing the automatic backup in the above description, a point of time when a variation of the number of accesses to a directory path which is not set as the backup object by the administrator exceeds the predetermined threshold value may be set as the timing of the automatic backup.

Alternatively, a point of time when an accumulated value of the number of access users or accesses exceeds a predetermined threshold value may be set as the timing of the automatic backup, and the access user number files 221 and the tables T1 and T2 may be deleted after the backup request is issued.

FIFTH MODIFIED EXAMPLE

Figure 26:
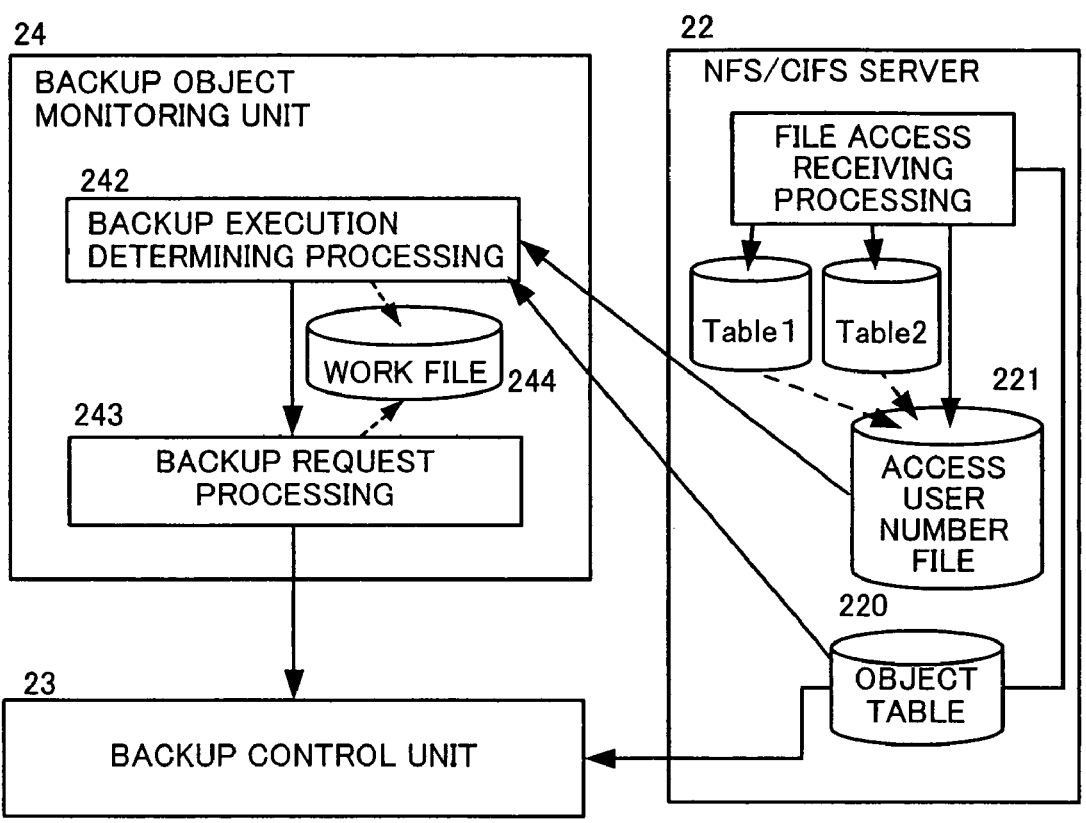
FIG. 26 shows a fifth modified example, and is an explanatory diagram showing a processing flow with the backup object monitoring unit placed at the center.

Although the backup object files preset by the administrator are designated from the managing client computer 7 in the embodiments described above, as shown in FIG. 26, a backup object table 220 is here provided in the NFS/CIFS server 22 and set from the managing client computer 7. Then, the backup object monitoring unit 24 may determine the directory paths and the files, which are not the backup objects set by the administrator and necessary to be backed up, by comparing the access user number file 221 and the backup object table 220 with each other.

In this case, the backup range acquisition processing 241 becomes unnecessary, and the load on the NAS 1 can be reduced.

It should be noted that, though the tape drive 3 and the backup system 101 are shown as the backup system in the above-described respective embodiments and modified examples, an optical disk drive and a semiconductor capable of holding stored contents can be used as these backup systems.

Further, it is possible to adopt a data backup method according to the above, in which data in a directory path in which the frequency is larger than a preset value is transferred to a system in a network different from that including the first system, and data in a directory path in which the frequency is equal to or less than the preset value is transferred to the system in the network identical to that connected to the first system.

While the present invention has been described in detail and pictorially in the accompanying drawings, the present invention is not limited to such detail but covers various obvious modifications and equivalent arrangements, which fall within the purview of the appended claims.

What is claimed is:

1. A data backup method for storing data for which a write request has been received to a first system in a directory path designated by the write request and transferring the data to a second system, the method comprising:

presetting a directory path for a backup object to be transferred to the second system;

storing the data in the directory path for the first system based on the write request;

comparing the directory path for the received write request and the directory path for the backup object transferred to the second system with each other, and when the directory paths match each other, transferring the stored data to the second system;

when the directory path designated by the write request does not match the directory path for the backup object, determining whether or not the designated directory path matches a preset condition;

when the designated directory path matches the preset condition, issuing a request to transfer data in the designated directory path to the second system; and transferring the data to the second system based on the request.

2. The data backup method according to claim 1, wherein, when the directory path designated by the write request is not the directory path for the backup object, determining whether or not the designated directory path matches a preset condition comprises:

computing a frequency of the write requests to the directory path designated by the write request; and determining that the designated directory path matches the condition when the frequency is larger than a preset value.

3. The data backup method according to claim 1, wherein, when the directory path designated by the write request is not the directory path for the backup object, determining whether or not the designated directory path matches a preset condition comprises:

obtaining an attribute of the directory path designated by the write request; and determining that the designated directory path matches the condition when the attribute matches a preset attribute.

4. The data backup method according to claim 2, wherein computing a frequency of the write request comprises:

acquiring an identifier of a user who has made the write request;

accumulating the directory paths for which the write requests have been received; and computing, as the frequency, the number of users who have made the write requests based on the identifiers of the users for each of the directory paths.

5. The data backup method according to claim 2, wherein computing a frequency of the write request comprises:

acquiring an identifier of a user who has made the write request;

accumulating the directory paths for which the write requests have been received in a predetermined period; and computing, as the frequency, a variation of the number of users who have made the write requests based on the identifiers of the users for each of the directory paths.

6. The data backup method according to claim 2, wherein computing a frequency of the write requests comprises:

accumulating the directory paths for which the write requests have been received; and computing, as the frequency, the number of times in which the write requests are made for each of the directory paths.

7. The data backup method according to claim 2, wherein computing a frequency of the write requests comprises:

accumulating the directory paths for which the write requests have received in a predetermined period; and computing, as the frequency, a variation of the number of times in which the write requests are made for each of the directory paths.

8. The data backup method according to claim 4 or 6, wherein transferring the data to the second system based on the request comprises transferring data in a directory path in which the frequency is larger than a preset value to the second system for each preset backup cycle.

9. The data backup method according to claim 5 or 7, wherein transferring the data to the second system based on the request comprises transferring data in a directory path in which the frequency is larger than a preset value to the second system when the frequency exceeds a preset threshold value.

10. The data backup method according to any one of claims 4 to 7, wherein transferring the data through the second system based on the request comprises:
    detecting a load on the first system; and
    when the load is equal to or less than a preset value, transferring data in a directory path in which the frequency is larger than a preset value to the second system.

11. The data backup method according to claim 2, wherein:
    the second system comprises a system in a network identical to a network connected to the first system and a system in a network different from the network connected to the first system; and
    transferring the data to the second system based on the request changes a network of a transfer destination according to an order of the frequency.

12. The data backup method according to claim 3, wherein:
    the second system comprises a system in a network identical to a network connected to the first system and a system in a network different from the network connected to the first system; and
    transferring the data to the second system based on the request changes a network of a transfer destination according to the attribute of the directory path.

13. A data backup system, comprising:
    a write control unit that stores data for which a write request has been received to a first system in a directory path designated by the write request;
    a backup control unit that transfers the data to a second system when the directory path is a backup object;
    a backup determination unit that determines whether or not the directory path designated by the write request matches a preset condition when the directory path is not the backup object; and
    a backup request unit that issues to the backup control unit a request to transfer data in the directory path to the second system when the directory path matches the condition.

* * * * *